(12) United States Patent
Teramoto

(10) Patent No.: US 6,590,363 B2
(45) Date of Patent: Jul. 8, 2003

(54) CHARGING STATION

(75) Inventor: Masahiko Teramoto, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/146,128

(22) Filed: May 16, 2002

(65) Prior Publication Data

US 2002/0195989 A1 Dec. 26, 2002

(30) Foreign Application Priority Data

May 16, 2001 (JP) ........................................ 2001-145717

(51) Int. Cl.⁷ .............................................. H01M 10/46
(52) U.S. Cl. ........................................ 320/101; 290/55
(58) Field of Search ................................ 320/101, 107, 320/109, FOR 160, DIG. 34, DIG. 35; 136/244, 259, 291, 292; 290/43, 44, 54, 55

(56) References Cited

U.S. PATENT DOCUMENTS

| 4,023,368 A | 5/1977 | Kelly |
| 4,119,863 A | 10/1978 | Kelly |
| 5,280,827 A | 1/1994 | Taylor et al. |
| 5,394,016 A | 2/1995 | Hickey |
| 5,986,429 A | 11/1999 | Mula, Jr. |

FOREIGN PATENT DOCUMENTS

| DE | 19608330 A1 | 9/1997 |
| DE | 29623808 U1 | 8/2000 |
| JP | 11-220155 | 8/1999 |

Primary Examiner—Edward H. Tso
(74) Attorney, Agent, or Firm—McDermott, Will & Emery

(57) ABSTRACT

A wind power generator is enclosed at the center of a duct. The duct comprises an upper and lower duct panels having solar panel. The distance between the upper and lower duct panels is the smallest at the center where the wind power generator is mounted. The distance gradually increases as the upper and lower duct panels extend further away from the wind power generator. Thus, the duct collects wind blowing toward the wind power generator and increases the speed of the collected wind, thereby achieving an increase in the quantity of power generated in the wind power generator.

14 Claims, 16 Drawing Sheets

CONSTRICTION AT VERTICAL PLANE
MULTIPLIED BY 3.0=1/2, 2/6.7

CONSTRICTION AT HORIZONTAL PLANE MULTIPLIED BY 3.1=6.92/2.2

(a)

(b)

CHARGING STATION

INCORPORATION BY REFERENCES

The disclosure of the following priority application is incorporated herein by reference:
Japanese Patent Application No. 2001-145717 filed May 16, 2001

BACKGROUND OF THE INVENTION

1. Field of the Invention

The present invention relates to a charging station that charges a battery.

2. Description of the Related Art

Disclosed in JP-A-Hei 11(1999)-220155 is a charging station that charges batteries and includes a solar panel and a wind power generator. The charging station utilizes the power obtained through a solar power generator and the power obtained through a wind power generator. In this charging station, the power to charge the battery is obtained by using the natural energy created by sunlight and wind.

SUMMARY OF THE INVENTION

However, the charging station having solar panels and a wind power generator in the related art simply utilizes the power obtained through the solar power generator and the wind power generator, and is not designed by taking into consideration the need to improve the efficiency with which the two types of power are generated, to reduce the size of the charging station and the like.

An object of the present invention is to provide a charging station with a more compact size that achieves an improvement in the efficiency in both the solar power generator and the wind power generator.

A charging station according to the present invention comprises a duct, a wind power generator, and a battery. The duct is formed with an upper duct panel and a lower duct panel. The upper and lower duct panels include at least a solar panel. The wind power generator is provided between the upper and lower duct panels and generates power by using wind force. The battery stores power generated at the wind power generator and the solar panel. The duct is formed so as to collect wind blowing toward the wind power generator and to increase the speed of the collected wind.

DESCRIPTION OF THE PREFERRED EMBODIMENTS

First Embodiment

Figure 1:
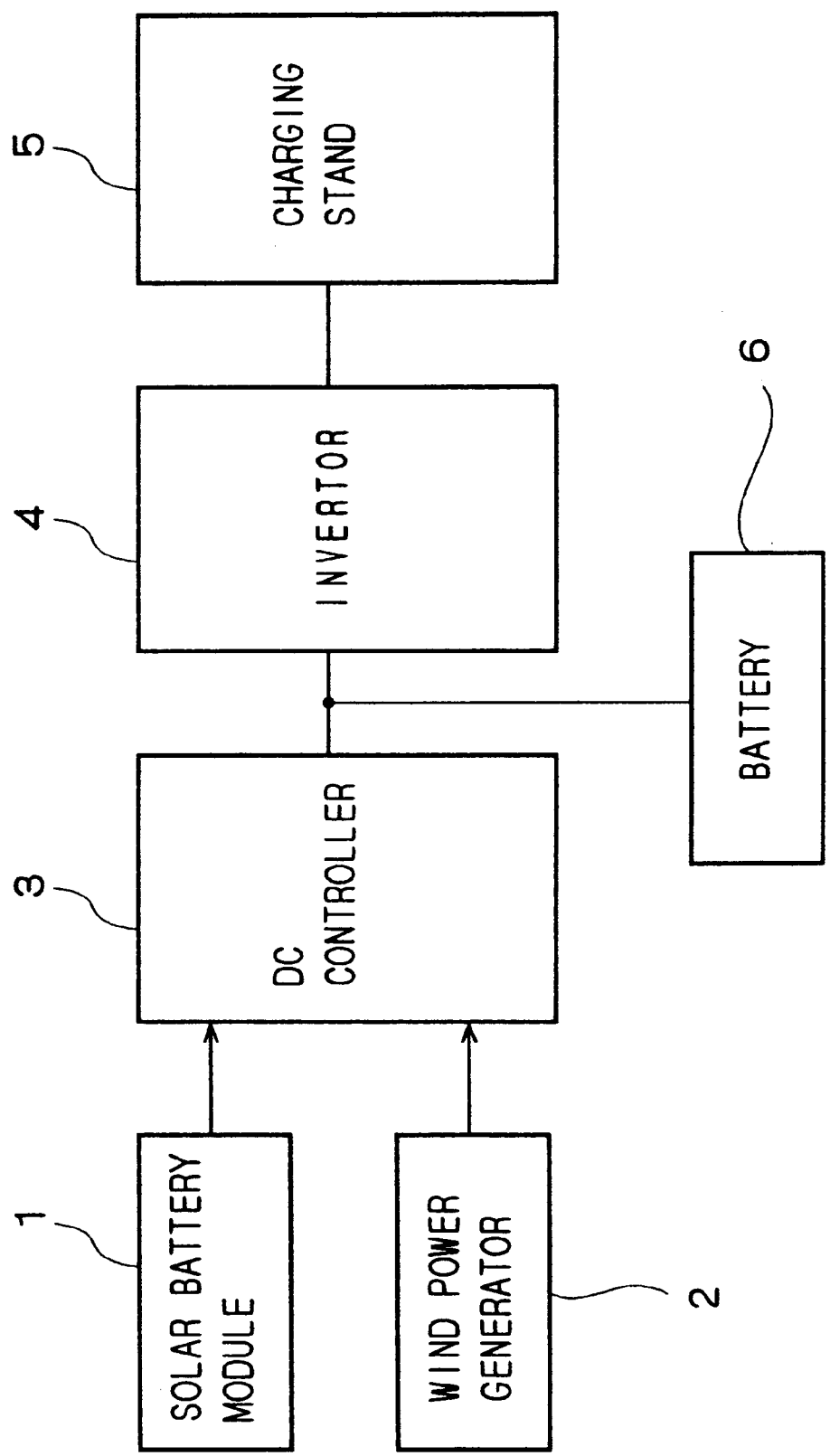
FIG. 1 shows the structure adopted in the first embodiment of the charging station according to the present invention.

FIG. 1 shows the structure adopted in an embodiment of the charging station according to the present invention. It is to be noted that while the present invention is explained as a charging station employed to charge an electric car in reference to the following embodiments, the present invention is not limited to this example and it may be adopted in, for instance, a domestic power storage application. The charging station in FIG. 1 includes a solar battery module 1, a wind power generator 2, a DC controller 3, an invertor 4, a charging stand 5 and a battery 6. This is a structure commonly adopted in the charging stations achieved in the first–fifth embodiments explained below.

The solar battery module 1 includes a plurality of solar panels that generate power upon receiving sunlight. The solar panels are mounted at the roof of the charging station to allow them to be irradiated by sunlight readily. The wind power generator 2, which generates power by using the force of wind, is mounted at an upper position of the charging station. The solar battery module 1 and the wind power generator 2 is both connected to the DC controller 3. The DC controller 3 controls the DC power generated at the solar battery module 1 and the wind power generator 2. Namely, it implements current control to prevent the occurrence of an excess current, a reverse current or the like and voltage control to prevent an overcharge, an excess voltage or the like. The DC power having undergone the control described above is first converted to a voltage suitable for the battery that is charged by the DC power with the resulting voltage.

The invertor 4 converts the power stored at the battery 6 or the DC power having been generated at the solar battery module 1 and the wind power generator 2 that is directly supplied to the invertor to AC power achieving a desired level. The AC power resulting from the conversion at the invertor 4 is then supplied to an electric vehicle or car via the charging stand 5.

Figure 2:
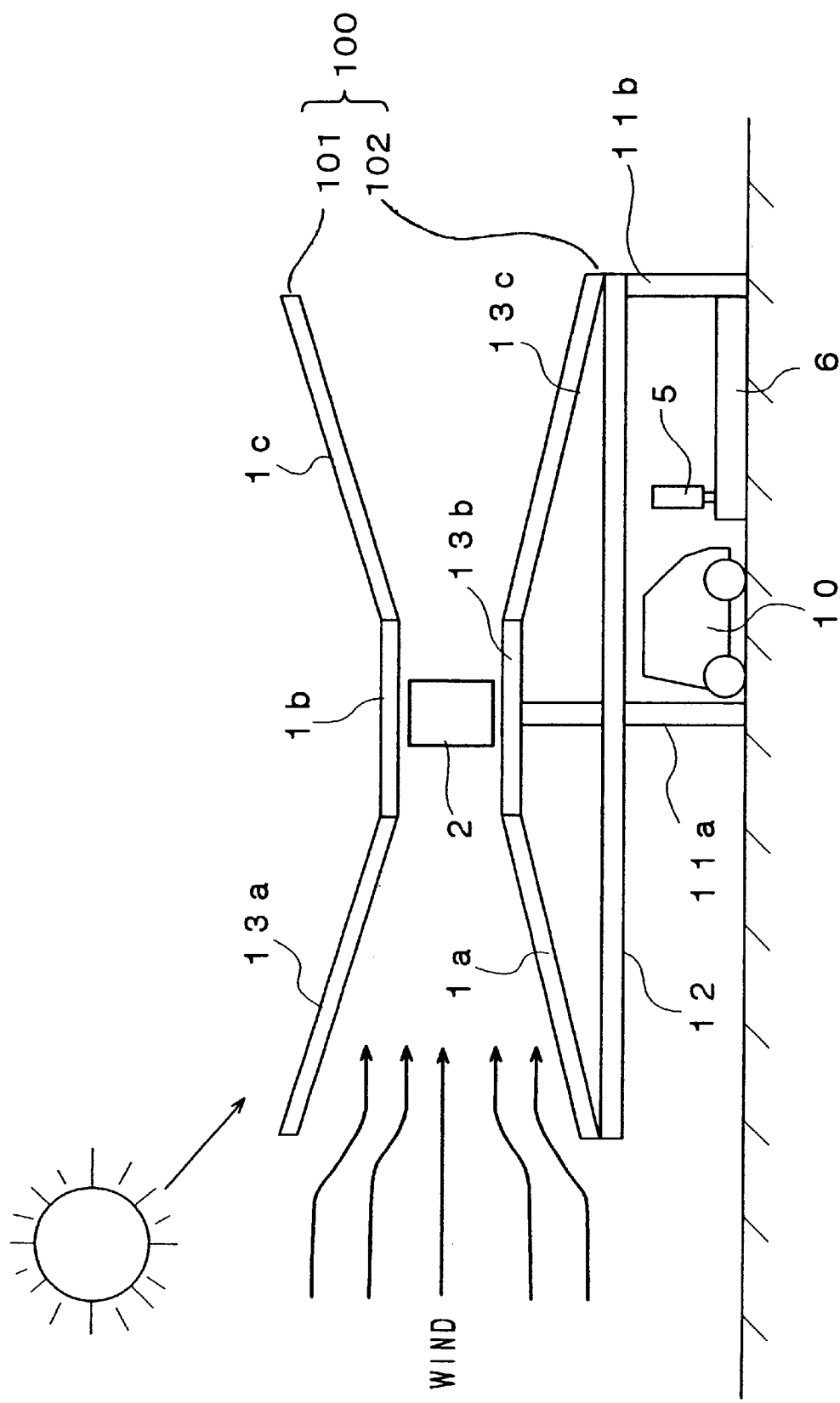
FIG. 2 is an external view of the charging station achieved in the first embodiment of the present invention.
Figure 3:
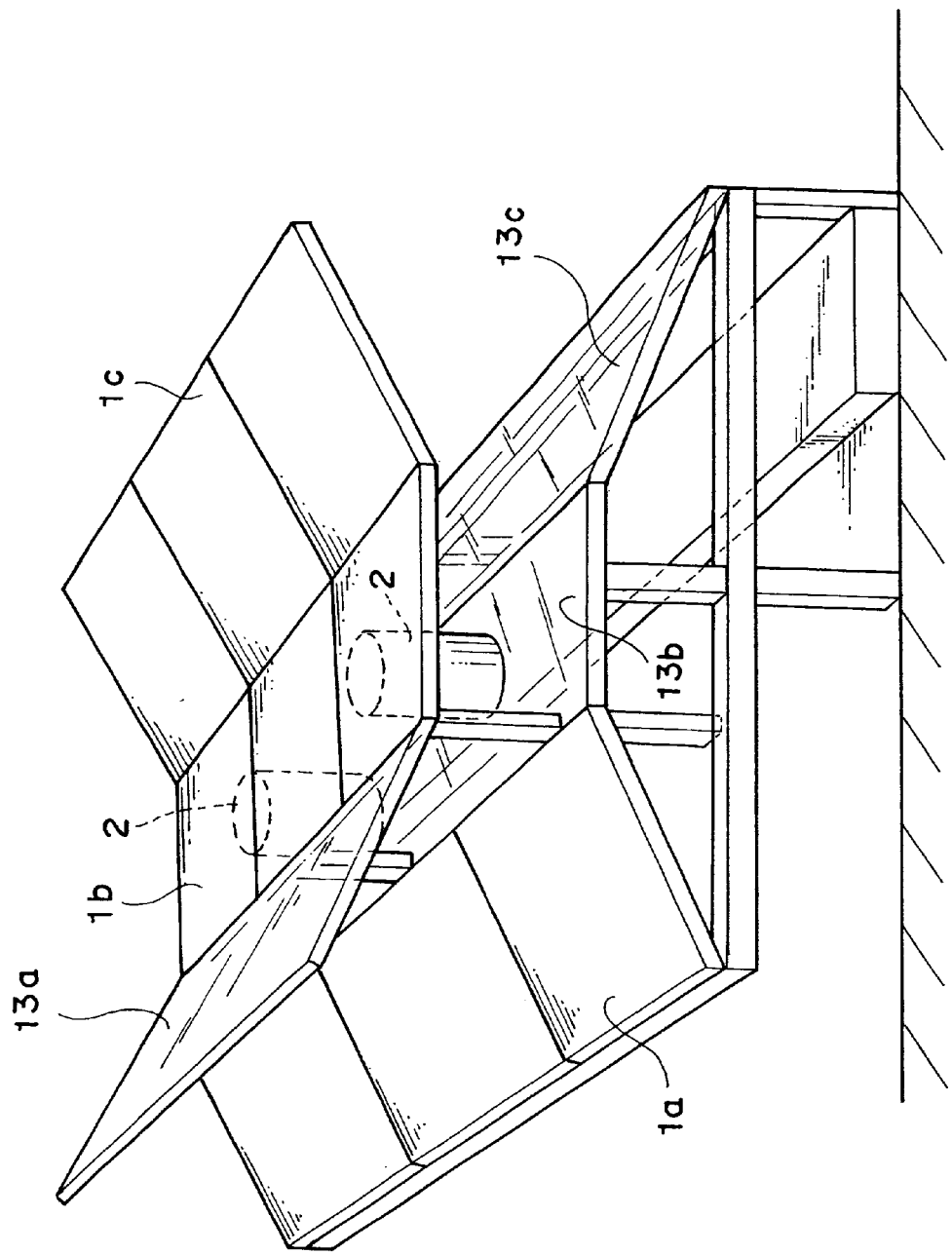
FIG. 3 is an external view of the charging station achieved in the first embodiment of the present invention, taken diagonally from above.

FIG. 2 is a side elevation of the charging station achieved in the first embodiment of the present invention and FIG. 3 shows the charging station viewed diagonally from above. This charging station is capable of charging three electric cars at a time. In the first embodiment, the charging station comprises a duct 100 constituted of an upper duct panel 101 and a lower duct panel 102. A pair of Savonius wind power generators 2 is arranged at the center of the duct 100 as shown in FIG. 3.

The Savonius wind power generator 2 employs a Savonius wind mill which is a vertical-axis windmill. A Savonius wind mill, which generates a relatively large torque and thus can be started up even at low wind regardless of the direction in which the wind is blowing, has an advantage in that it can be utilized at a location where there is a week wind. The Savonius wind power generators 2 (hereafter simply referred to as the wind power generator) are supported by supporting bodies 11a and 11b and a reinforcement 12 and are provided at a position above the ground.

The upper duct panel 101 consists of an inclined panel 13a transmitting visible light, a horizontal solar panel 1b, and an inclined solar panel 1c. The lower duct panel 102 consists of an inclined solar panel 1a, a horizontal panel 13b transmitting visible light, and an inclined panel 13c transmitting visible light. The wind power generator 2 is enclosed by the upper and lower duct panels 101 and 102. The solar panels 1a–1c are set facing the direction in which sunlight irradiates over the longest period of time during the day.

The upper and lower duct panels 101 and 102 enclosing the wind power generators 2 may all be constituted of solar panels. However, the solar panels 1a–1c are provided at positions facing the direction in which the sunlight irradiates over an extended period of time and the other panels are constituted of visible light transmitting panels 13a–13c in the embodiment. As a result, a reduction in the production costs is achieved compared to the production cost of a charging station having all its panels constituted of solar panels. In addition, the solar panel la of the lower duct panel 102 can be received sunlight through the visible light transmitting panel 13a. It is to be noted that the lower panels 13b and 13c may be constituted of panels other than visible light transmitting panels.

As shown in FIGS. 2 and 3, the distance between the horizontal solar panel 1b of the upper duct panel 102 and the horizontal panel 13b of the lower panel 102 is the smallest where the wind power generators 2 are provided. The distance between the visible light transmitting panel 13a and the solar panel 1a and the distance between the visible light transmitting panel 13c and the solar panel 1c are set so that the distance between them gradually increases as they extend away from the wind power generators 2. Namely, the visible light transmitting panel 13a and the solar panel 1a, and the solar panel 1c and the visible light transmitting panel 13c form the inlet/outlet portions respectively. The solar panel 1b and the visible light transmitting panel 13b are parallel to each other and form a space between which a pair of wind power generators 2 is enclosed.

Figure 4:
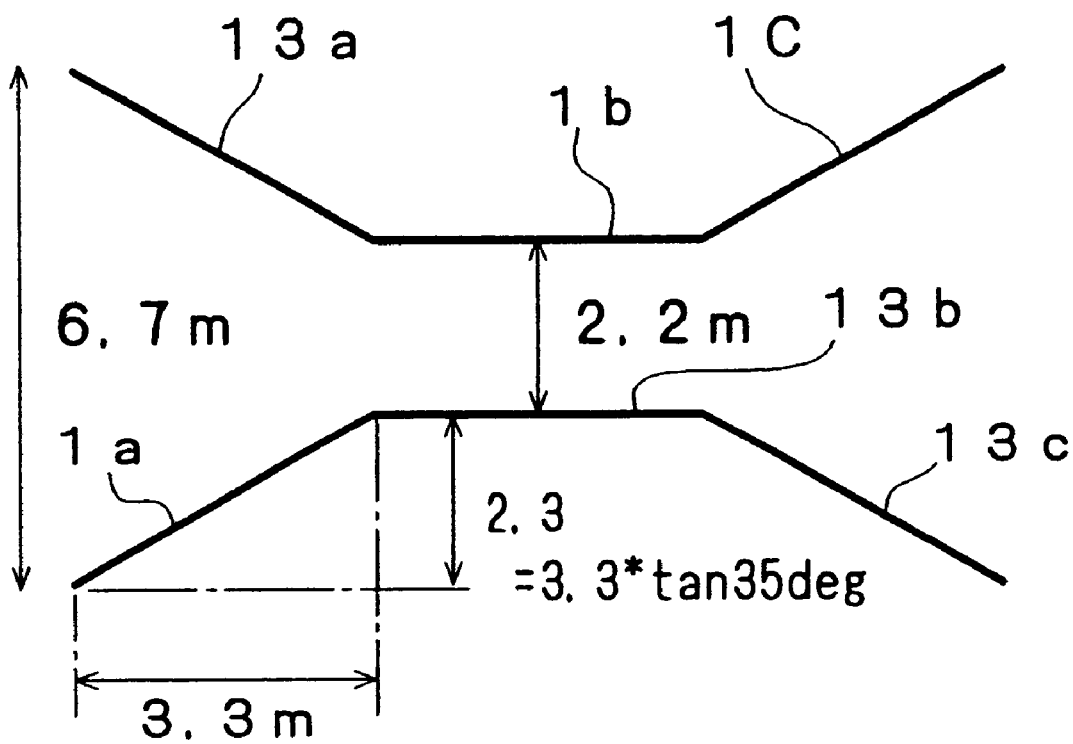
FIG. 4 shows an example of dimensions of the solar panels and the visible light transmitting panels in the first embodiment of the charging station according to the present invention.
Figure 5:
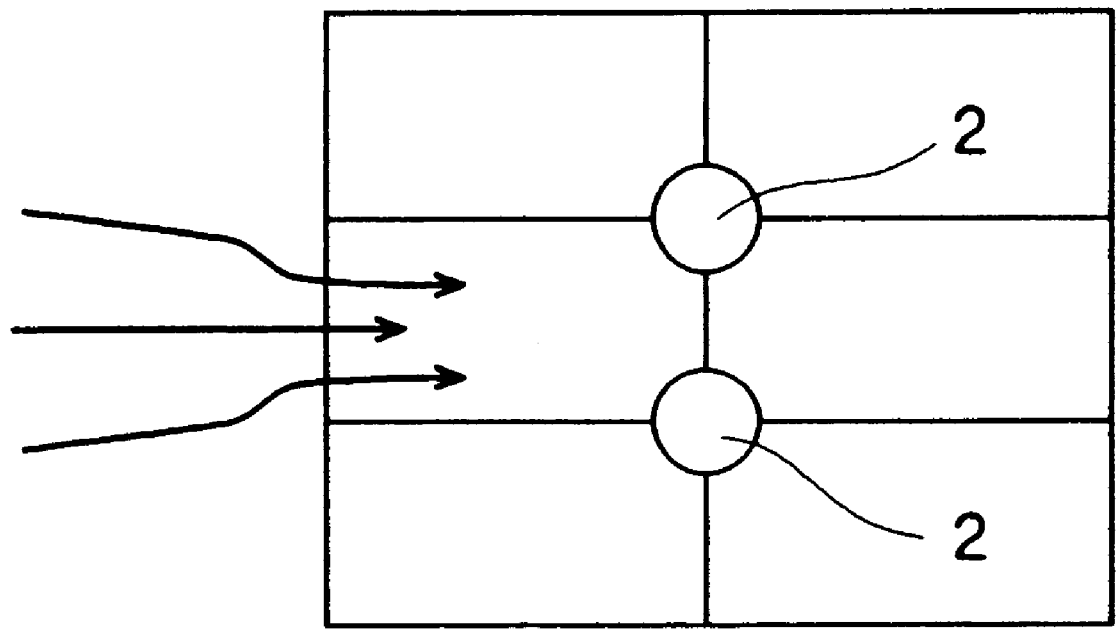
FIG. 5 is a top view of the charging station in the first embodiment of the present invention.

FIG. 4 shows an example of the dimensions achieved by the solar panels 1a–1c and the visible light transmitting panels 13a–13c in the first embodiment. The distance between the panels 1b and 13b, i.e., the shortest distance between the upper and lower panels 101 and 102 explained above, is 2.2 m, and the longest distance between the upper and lower duct panels 101 and 102, i.e., the distance on the outer ends, is 6.7 m. The dimensions to be adopted in the present invention are not limited to the examples shown in FIG. 4. FIG. 5 shows the wind power generators 2 and the panels mounted above and below the wind power generators 2, viewed from above. The circled members in the figure are the wind power generators 2. The duct 100 opens widely at the left and right ends in the figure, i.e., toward the outside of the wind power generators 2. Thus the wind force is the greatest when the wind flows in from the left or right end in FIG. 5.

Due to the above-described duct 100 constituted of the solar panels 1a–1c and the visible light transmitting panels 13a–13c, the quantity of wind guided from the wide openings to the wind power generators 2 increases as compared to a structure having upper and lower duct panels installed parallel to each other. As a result the quantity of power generated by the wind power generators 2 increases. This means that the number of solar panels 1a–1c can be reduced, since even if the overall quantity of power generated through solar power generation is reduced, the overall quantity of power in the charging station can still be achieved with desired level. In addition, the size of the wind power generators 2 can be reduced as well as reducing the number of solar panels 1a–1c. Consequently, the overall size of the charging station can be reduced to minimize the production cost and the installation cost of the charging station.

Figure 6:
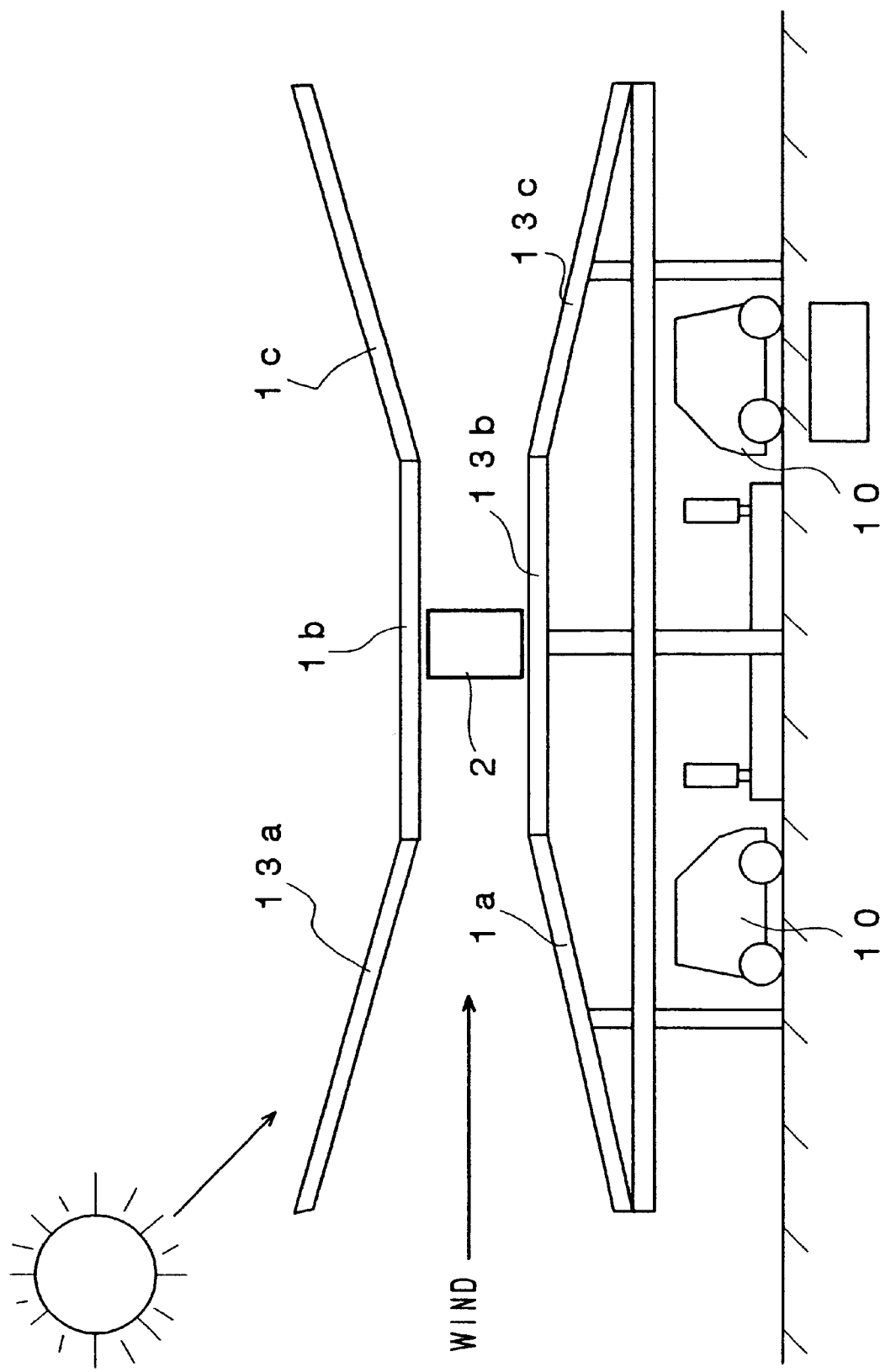
FIG. 6 is an external view of an example of a variation of the first embodiment of the charging station according to the present invention.
Figure 7:
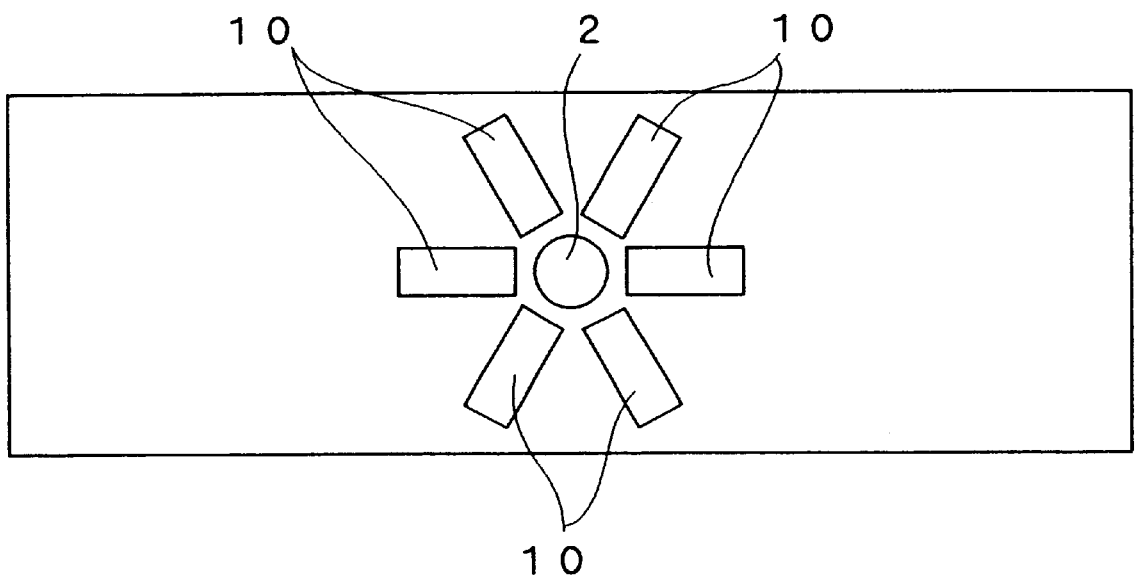
FIG. 7 shows the positional relationship between the wind power generator and electric cars assumed in the example of a variation of the first embodiment of the charging station according to the present invention.

FIGS. 6 and 7 show an example of a variation of the first embodiment of the charging station according to the present invention. This charging station is capable of charging six electric cars 10 at a time with six charging stands (not shown). FIG. 7 illustrates the positional arrangement to be achieved by a power generator 2 and the electric cars 10. As shown in FIG. 7, up to six electric cars 10 can be positioned around the power generator 2. The mounting positions of the solar panels 1a–1c and the wind power generator 2 and the like are the same as those assumed in the charging station shown in FIG. 2. In other words, as long as the solar panels 1a–1c and the wind power generator 2 achieve the structure explained earlier, the present invention may be adopted just as successfully regardless of any changes in the number and positions of the charging stands.

According to the first embodiment discussed above, solar panels provided above and below the wind power generator form a duct together with the transmitting visible light so as to allow wind to be taken into the wind power generator effectively. Since this increases the quantity of power generated by the wind power generator, the number of solar panels may be reduced or the wind power generator may be miniaturized to achieve a desired overall output of power in the charging station. As a result, the size of the entire charging station can be reduced.

According to the first embodiment, a Savonius wind power generator is employed so that the charging station can operate at a location where the wind is not strong by taking advantage of the Savonius wind power generator capable of engaging in operation in low wind.

Second Embodiment

Figure 8:
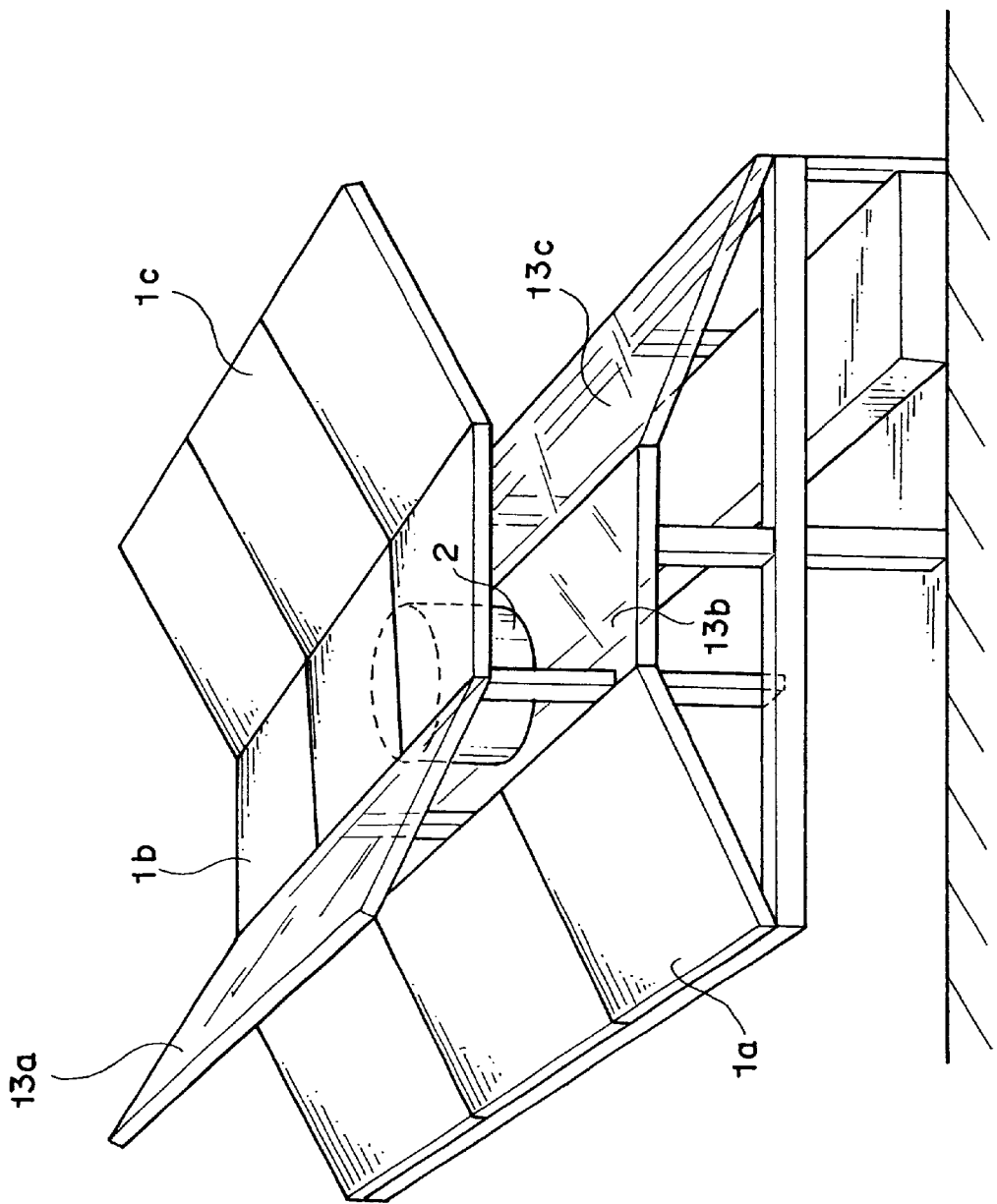
FIG. 8 is an external view of the charging station achieved in the second embodiment of the present invention, taken diagonally from above.
Figure 9:
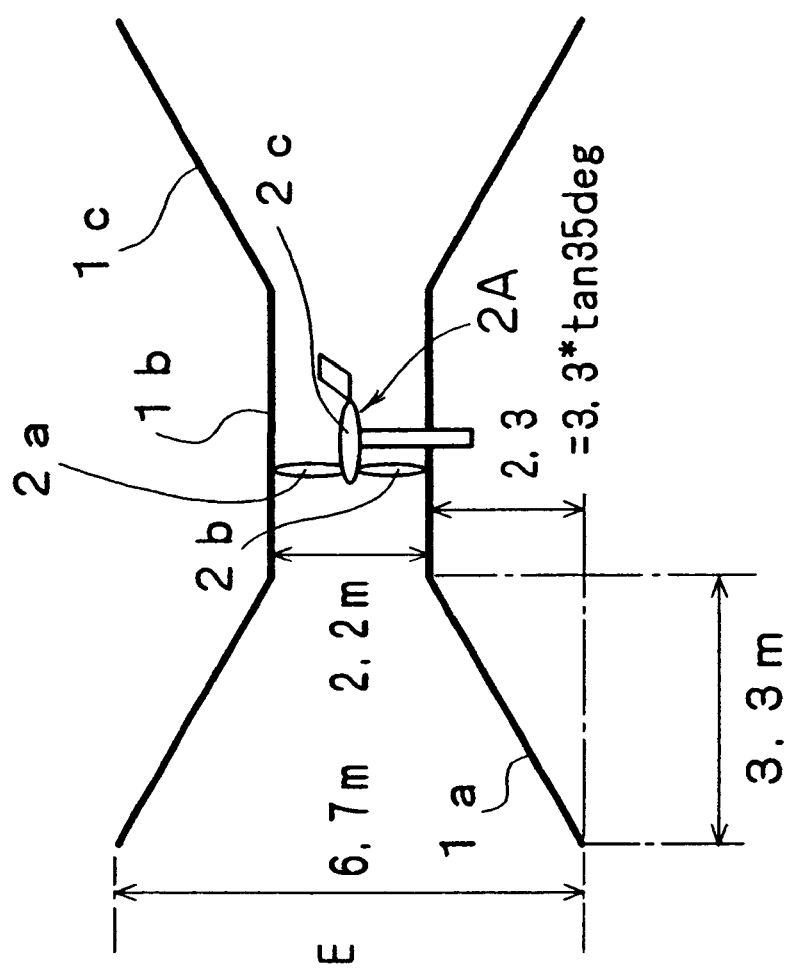
FIG. 9 shows the dimensions of the solar panels, the visible light transmitting panels and the wind power generator assumed in an embodiment of the charging station according to the present invention.
Figure 10:
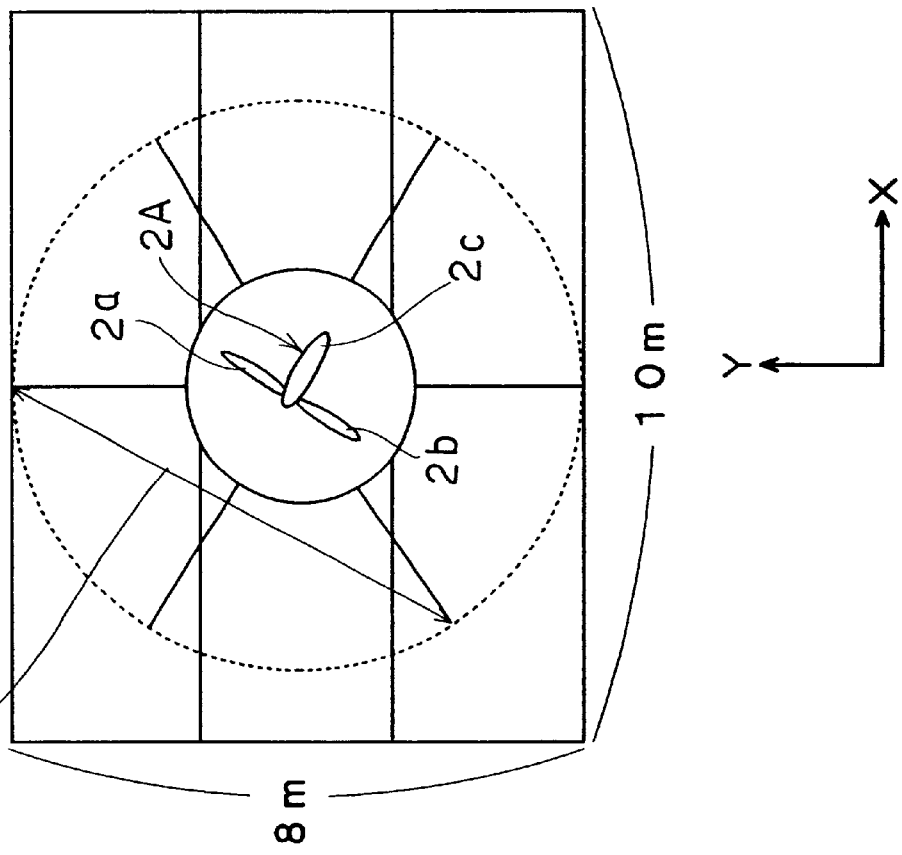
FIG. 10 shows the dimensions of the wind power generator assumed in an embodiment the charging station according to the present invention.

FIGS. 8–10 illustrate the second embodiment of the charging station according to the present invention. It differs from the charging station in the first embodiment in a type of wind power generator. Namely, a blade-type wind power generator 2A is employed in the charging station in the second embodiment. The blade-type wind power generator 2A achieves a greater output upon receiving a given level of wind force compared to a Savonius wind power generator. The mounting positions of, and the structure achieved, by the solar panels 1a–1c and the visible light transmitting panels 13a–13c are the same as those in the charging station in the first embodiment.

FIG. 9 is a side elevation showing the dimensions of the solar panels 1a–1c and the visible light transmitting panels 13a–13c and the positional relationship of the blade-type wind power generator 2A to the panels in the embodiment, and FIG. 10 shows the charging station viewed from above. While FIGS. 9 and 10 show only two blades on the blade-type wind power generator 2A, it is provided with a plurality of blades 2a and 2b. A rotating shaft 2c rotates upon receiving wind at the wind mill constituted of the plurality of blades 2a and 2b to drive the power generator. Since the acceleration factor of the wind velocity is 3–9 times in this blade-type wind power generator 2A, a rated output (5.4 m/s) can be assured as long as wind is blowing at 0.6 /s along the X direction—1.8 m/s along the Y direction in FIG. 10. In general, the output of a single blade-type wind power generator is larger than the total output of two Savonius wind power generators.

The charging station in the second embodiment, too, achieves advantages similar to those realized in the charging station in the first embodiment. Namely, by mounting the solar panels 1a–1c and the visible light transmitting panels 13a–13c as in the charging station in the first embodiment, an increase is achieved in the quantity of power generated by the blade-type wind power generator 2A. Since this allows the overall size of the charging station to be reduced, reductions in the production cost and the installation cost of the charging station are achieved.

Third Embodiment

Figure 11:
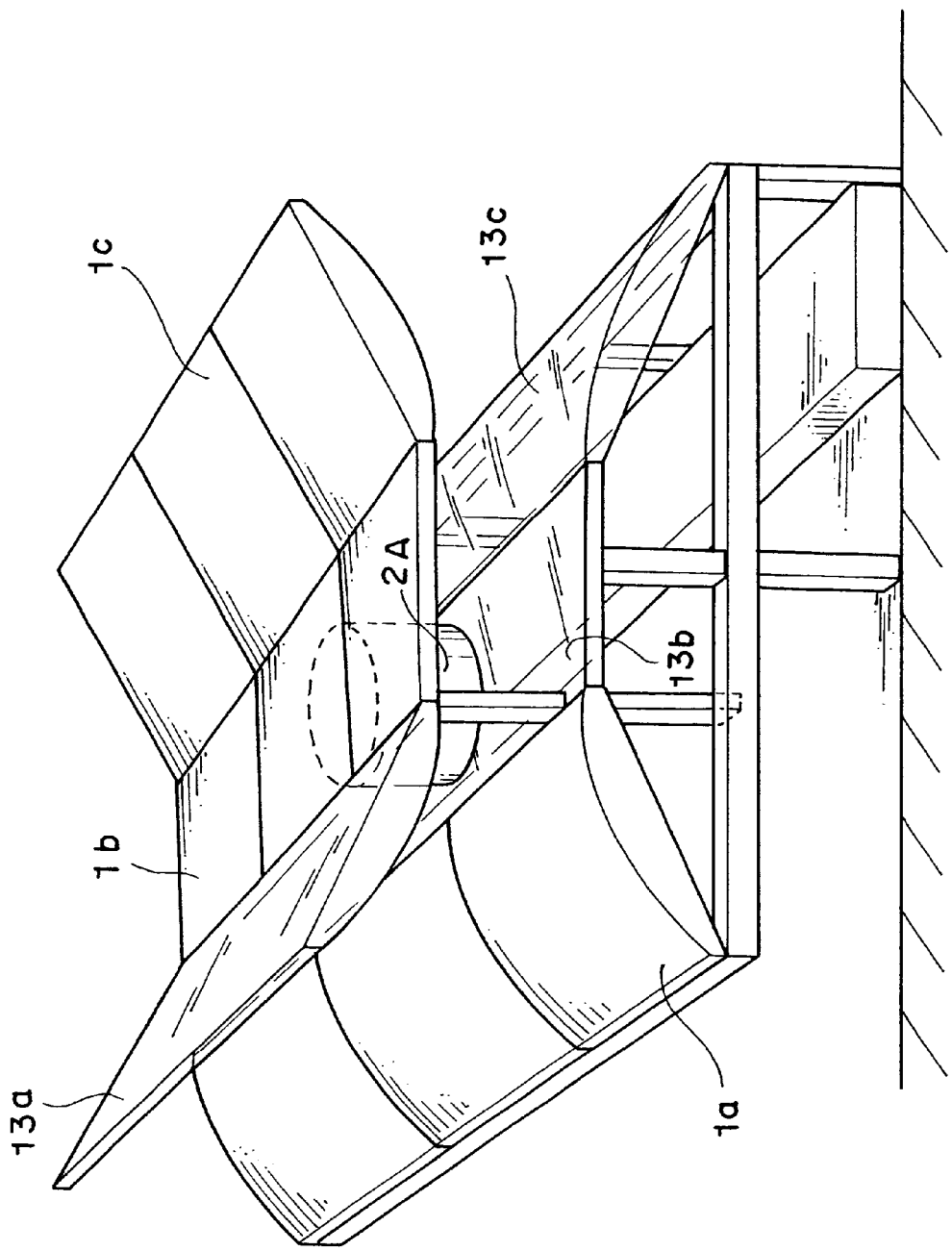
FIG. 11 is an external view of the charging station achieved in the third embodiment of the present invention, taken diagonally from above.
Figure 12:
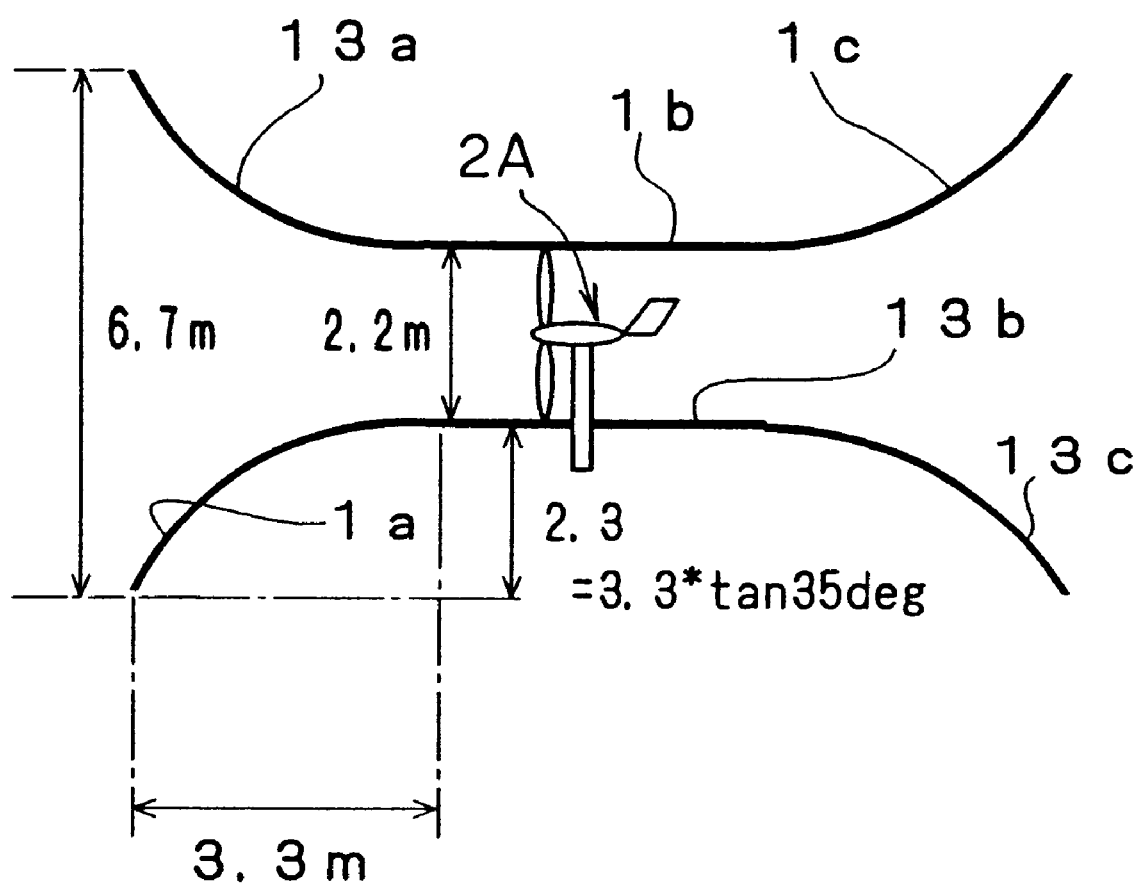
FIG. 12 shows the dimensions of the solar panels, the visible light transmitting panels and the wind power generator assumed in an embodiment of the charging station according to the present invention.

FIGS. 11 and 12 illustrate the third embodiment of the charging station according to the present invention. The blade-type wind power generator 2A utilized in the charging station in the second embodiment is provided. In the charging station in the third embodiment, the duct constituted of the solar panels 1a–1c and the visible light transmitting panels 13a–13c is designed to take advantage of hydrodynamics. Namely, as shown in FIGS. 11 and 12, the solar panels 1a–1c and the visible light transmitting panels 13a–13c achieve a curved shape at the inlet/outlet portions. Thus, they project out as they extend along the direction in which the wind flows in (flows out). In addition, the panel 1c and 13a are smoothly connected with the panel 1b, and panels 1a and 13c are smoothly connected with the panel 13b. The structural features such as the distance between the upper and lower duct panels 101 and 102 are identical to those assumed by the panels in the charging stations achieved in the first and second embodiments.

As a result, when the wind flows in from the left side to the wind power generator 2A in FIG. 12, for instance, the wind is allowed to flow into the wind power generator 2A with higher efficiency as compared to a structure having flat panels 1a and 13a, so that the speed with which the wind flows into the wind power generator 2A can be increased, Thus, since a larger quantity of power is generated by the wind power generator 2A than in the structure having flat solar panels 1a and 1c and flat visible light transmitting panels 13a and 13c, the overall size of the charging station can be reduced for the reason explained in reference to charging stations in the first and second embodiments.

Fourth Embodiment

Figure 13:
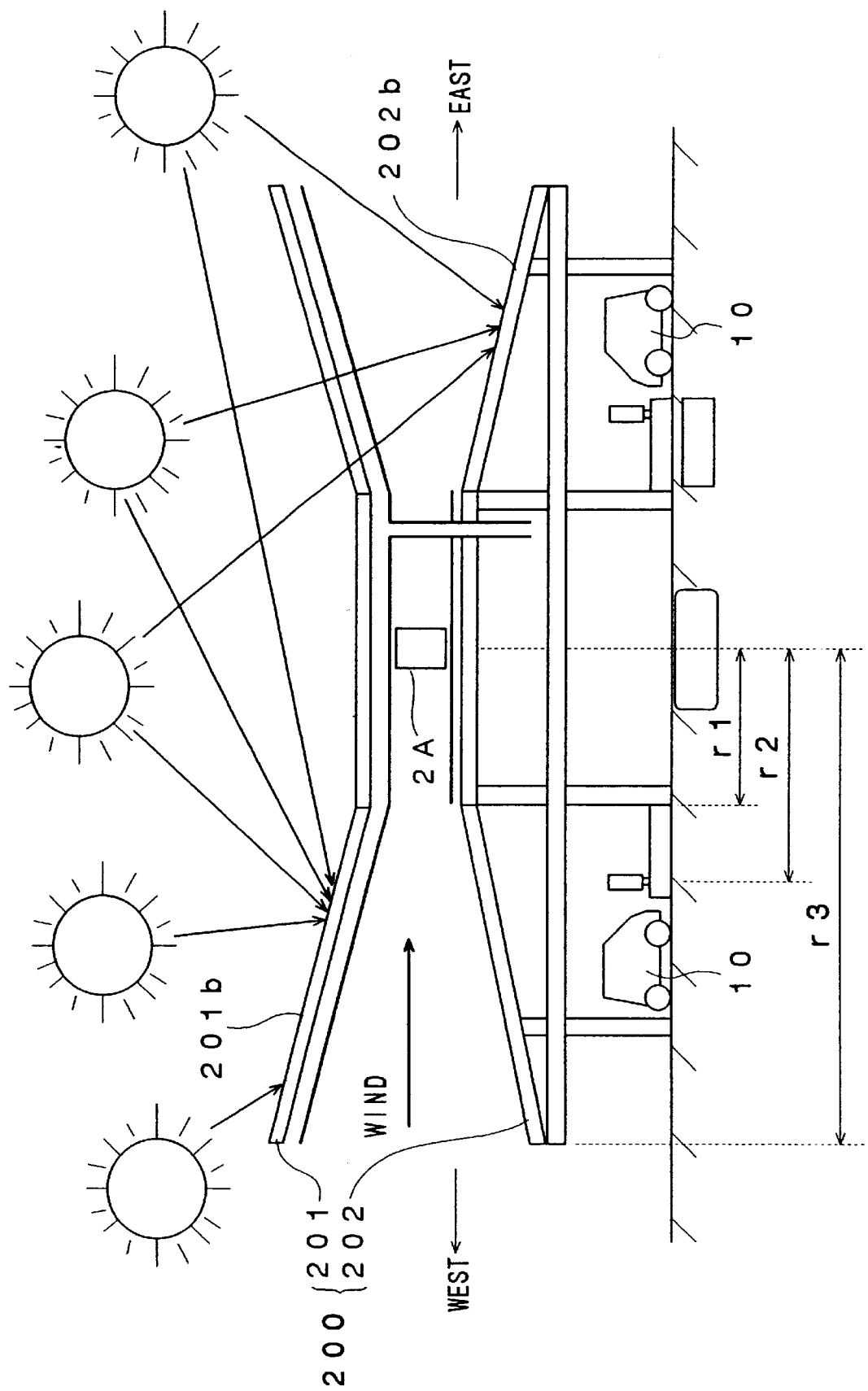
FIG. 13 is an external view of the charging station achieved in the fourth embodiment of the present invention.
Figure 14:
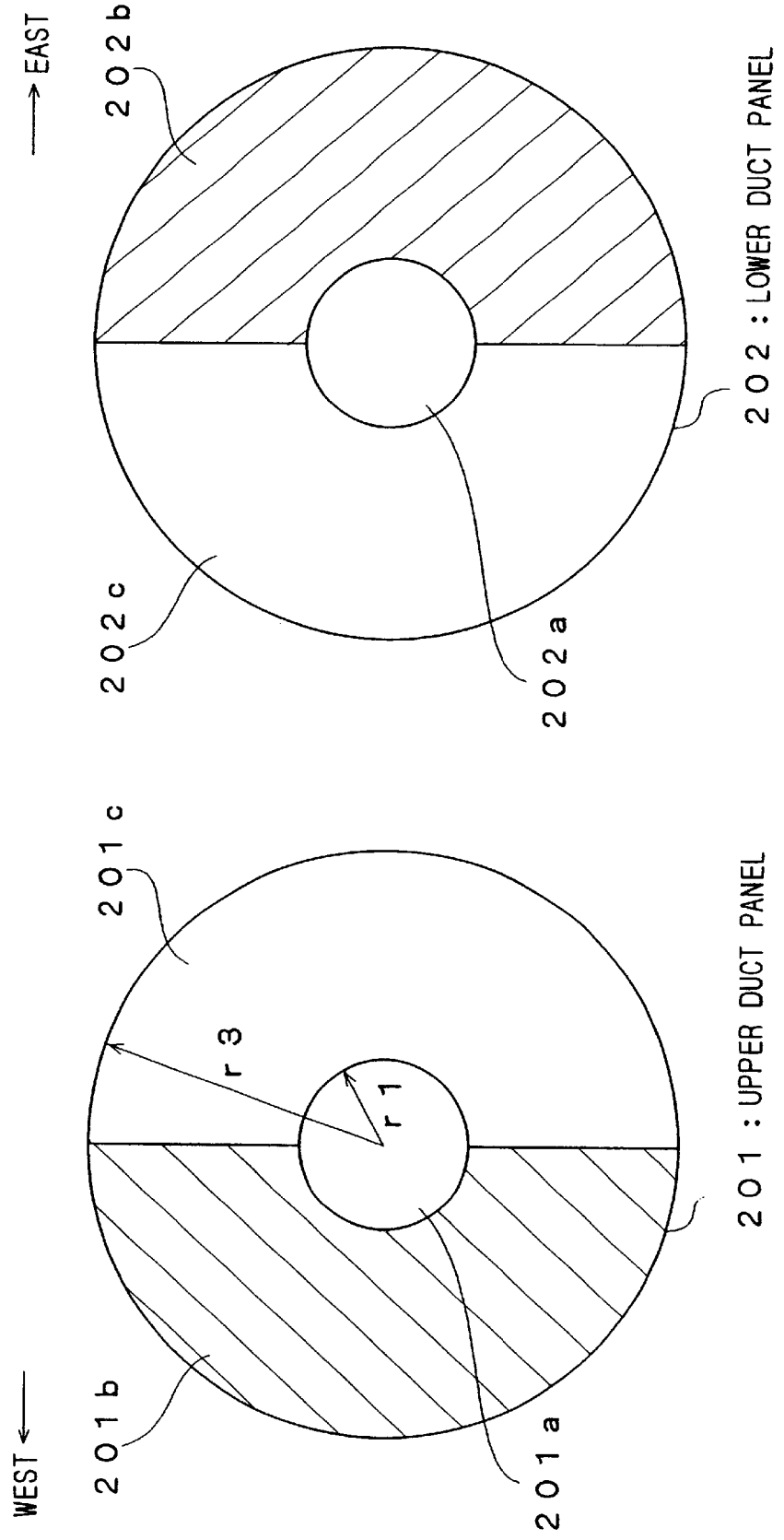
FIG. 14 is an external view of the solar panels in the fourth embodiment of the charging station according to the present invention.
Figure 15:
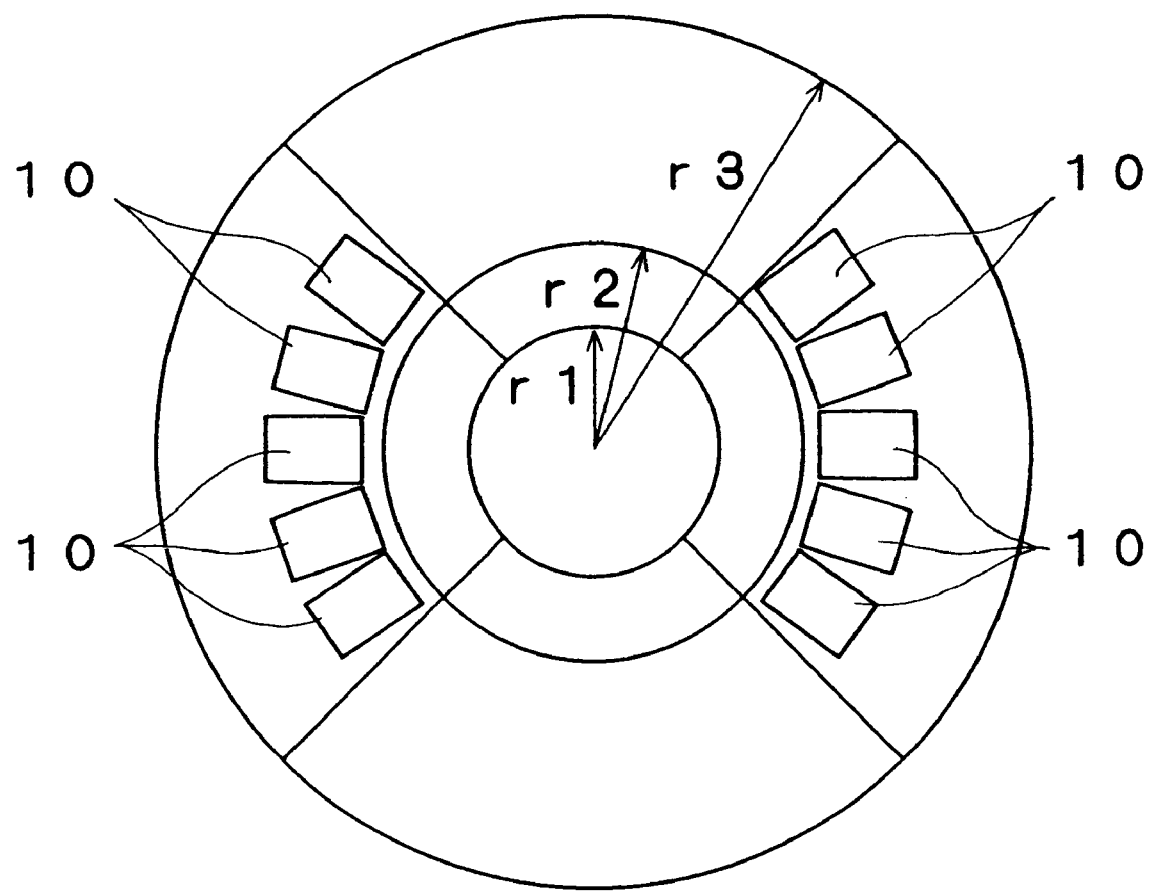
FIG. 15 shows an arrangement of a charging stand for ten vehicles in the fourth embodiment of the charging station according to the present invention.

FIGS. 13–15 illustrate the fourth embodiment of the charging station according to the present invention. The wind power generator is the blade-type wind power generator 2A employed in the charging stations in the second and third embodiments. The charging station in the fourth embodiment comprises a duct 200 constituted of an upper and lower duct panels 201 and 202 which are formed to be a bowl.

As shown in FIG. 14, the upper and lower duct panels 201 and 202 are formed to be a circular as viewed from above with a radius r3. The upper duct panel 201 is constituted of a panel 201a transmitting visible light, which is a circular plate with a radius r1, a left half annular shaped solar panel 201b, and a right half annular shaped panel 201c transmitting visible light. The lower duct panel 202 is constituted of a panel 202a transmitting visible light, which is a circular plate with a radius r1, a right half annular shaped solar panel 202b, and a left half annular shaped panel 202c transmitting visible light. The half annular shaped panel 201b, 201c, 202b and 202c have an inner radius r1 and an outer radius r3.

It is assumed that the right and left in FIG. 13 are directed to the east and the west respectively. Sunlight is incident onto the solar panels 201b and 202b with high efficiency.

All of the upper and lower duct panels 201 and 202 may be formed by only solar panels. The upper duct panel 201 may be formed by only solar panels and the lower duct panel 202 may be formed by only visible light transmitting panels. Alternatively, the upper duct panel 201 may be formed by only visible light transmitting panels and the lower duct panel 202 may be formed by only solar panels.

In the charging station according to the fourth embodiment, ten electric vehicles or cars are charged at once.

The wind power generator 2A is installed at the center of the circular duct 200. The distance between the upper and lower duct panels 201 and 202 is the smallest at the position where the wind power generator 2A is mounted as in the first–third embodiments. Namely, the distance between the upper and lower duct panels 201 and 202 increases as they extend further away from the wind power generator 2A, thereby achieving a structure of the inlet/outlet portions by which the speed of the wind increases.

Due to the duct being a circular configuration, the upper and lower duct panels 201 and 202 are made to act as a duct through the full 360° around the wind power generator 2A. Accordingly, the wind power generator 2A can take in wind from all directions with a high degree of efficiency, thereby achieving an increase in the quantity of power generated by the wind power generator 2A over a structure in which the wind from only a specific direction is taken in efficiently. As a result, for the reasons explained earlier, the overall size of the charging station can be reduced.

Fifth Embodiment

Figure 16A:
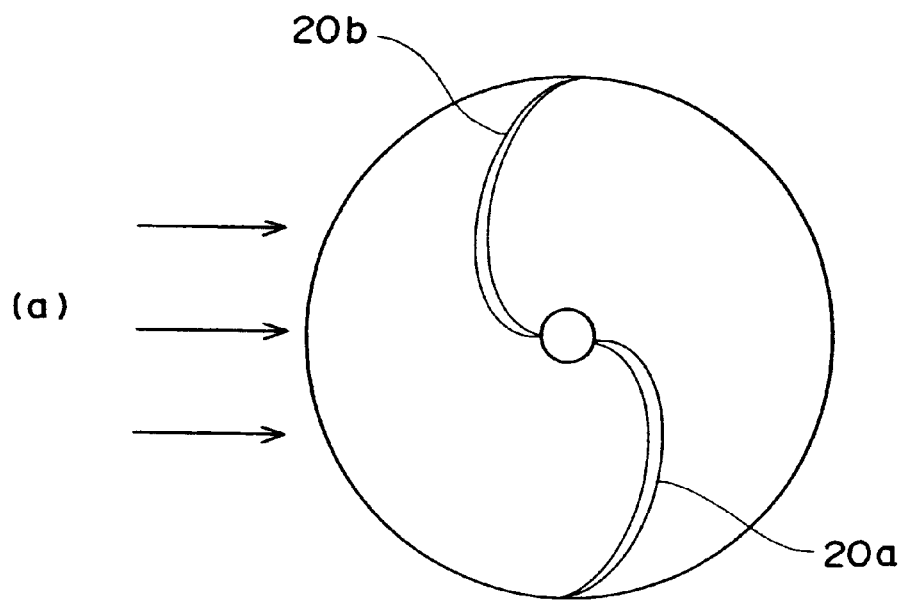
FIG. 16A illustrates the shape of the blades in a Savonius wind power generator in the related art.
Figure 16B:
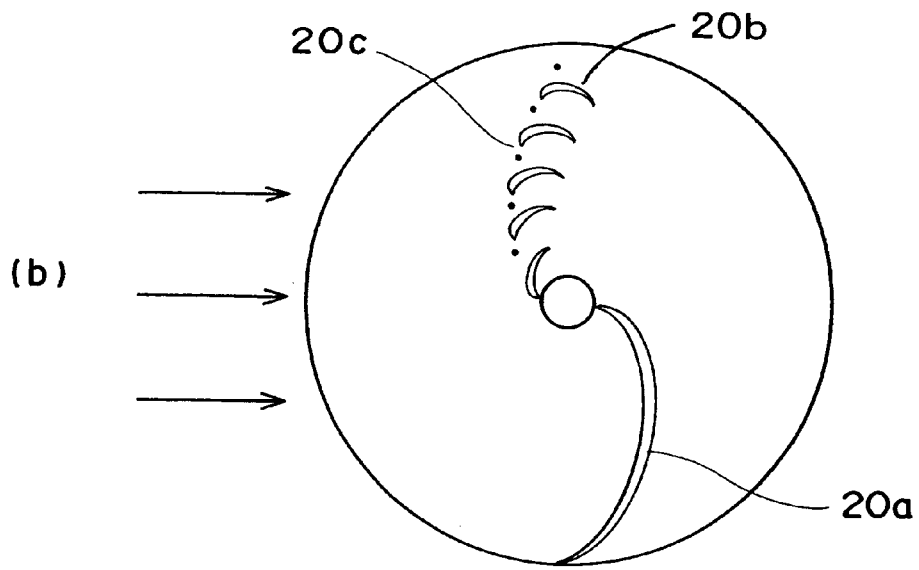
FIG. 16B shows the shapes of the blades in the Savonius wind power generator employed in the fifth embodiment of the charging station according to the present invention.

FIG. 16A is a top view of a Savonius wind power generator 2 in the related art and FIG. 16B is a top view of the Savonius wind power generator 2 utilized in the fifth embodiment of the charging station according to the present invention. The Savonius wind power generator 2 includes two blades 20a and 20b (rotating wings) which may be formed in, for instance, a curved shape, as shown in FIG. 16A to receive wind at their concave surfaces. When the wind flows from the left side in FIG. 16A, one of the two blades 20a and 20b, i.e., the blade 20a with its concave side facing the wind, tries to rotate upon receiving wind, but the other blade 20b with its convex side facing the wind receives the wind along the direction in which the rotation is hindered. Consequently, since the two blades 20a and 20b are inclined to move along opposite directions from each other relative to the wind flowing from a given direction, the rotational efficiency of the blades, i.e., the power generation efficiency, is compromised.

In order to address the problem discussed above, the Savonius wind power generator 2 in the fifth embodiment includes slits or openings, e.g., gaps 20c formed along the longitudinal direction or rotational axis of the the blades, i.e., a blade 20c, as illustrated in FIG. 16B. Since this prevents wind blowing toward the blade 20b with the gaps 20c from readily creating a resistance to the rotation, the resistance imparted along the non-rotational or reverse rotational direction can be reduced, which allows a smoother rotation than in the wind power generator having no gaps 20c at either of the two blades 20a and 20b. Thus, an improvement is achieved in the power generation efficiency and the quantity of power that is generated is increased as well. It is to be noted that the Savonius wind power generator 2 may be provided with more than two blades. In such a case, slits should be formed in at least one of the blades.

It is to be noted that the slits 20c do not necessarily need to be formed along the longitudinal direction of the blade as described above. Namely, the sole object is to reduce the resistance imparted when wind blows along the reverse rotational direction by forming gaps 20c, and thus, as long as this object is achieved, the gaps 20c and ultimately the blade 20b may take on any shape. For this reason, similar advantages are achieved by providing the blade 20a alone and omitting the other blade 20c.

According to the fifth embodiment, a gap is provided at at least one blade of the Savonius wind power generator to reduce the resistance manifesting when the wind blows along the non-rotational direction. Thus, the rotational efficiency of the wind power generator is improved and the quantity of power generated by the wind power generator is increased as well.

Any type of wind power generator may be employed in the charging station. When employing the Savonius wind power generator 2 described earlier, gaps may be created at one of the two blades to reduce the resistance imparted when the wind blows onto the blade with the gaps along the non-rotational direction, to achieve an increase in the quantity of power generated by the wind power generator 2. Moreover, a higher output than the output of the Savonius wind power generator 2 is obtained by utilizing the blade-type wind power generator 2A.

The present invention is not limited to the examples presented in the embodiments explained above. For instance, the sizes and the like of the solar panels are not limited to the dimensions mentioned earlier. Three or more wind power generators may be provided at the center of the duct having the solar panel as well. In addition, the charging station according to the present invention may be adopted to charge any electrically-driven apparatus other than an electric car. While an explanation is given above on an example in which a duct has a single wind passage, two or more wind passages may be provided in the duct. Also, while an explanation is given above on an example in which the wind power generator is provided at the center of the duct, it may be set off center as long as a duct effect is achieved.

What is claimed is:

1. A charging station comprising:
   a duct formed with an upper duct panel and a lower duct panel, said upper and lower duct panels including at least a solar panel;
   a wind power generator provided between said upper and lower duct panels that generates power by using wind force; and
   a battery that stores power generated at said wind power generator and said solar panel, wherein:
     said duct is formed so as to collect wind blowing toward said wind power generator and increases the speed of the collected wind.

2. A charging station according to claim 1, wherein:
   said upper duct panel and lower duct panel are rectangular respectively as viewed from above,
   said duct includes a pair of inlet/outlet portions, and
   a width of said each inlet/outlet portion gradually degreases toward said wind power generator.

3. A charging station according to claim 2, wherein:
   said inlet/outlet portions have an inner surface curved according to hydrodynamics.

4. A charging station according to claim 2, wherein:
   said wind power generator is provided between said pair of inlet/outlet portions.

5. A charging station according to claim 2, wherein:
   said upper duct panel includes a panel transmitting a visible light,
   said solar panel of said lower duct panel is arranged so as to receive a sunlight through said panel transmitting a visible light.

6. A charging station according to claim 2, wherein:
   said upper and lower duct panels are each constituted of the first–third panel elements, and
   said first and third panel elements are inclined to form said inlet/outlet portion respectively.

7. A charging station according to claim 2, wherein:
   said upper and lower duct panels are each constituted of the first–third panel elements,
   said first and third panel elements are inclined to form said inlet/outlet portion respectively, and
   said second panel elements of said upper and lower duct panels are parallel to each other to form a space between which said wind power generator is enclosed.

8. A charging station according to claim 1, wherein:
   said upper and lower duct panels are circular respectively as viewed from above,
   and the distance between the upper and lower duct panels becomes gradually reduced from the periphery of said upper and lower duct panels toward the center of said duct.

9. A charging station according to claim 8, wherein:
   said wind power generator is provided at the center of said duct.

10. A charging station according to claim 1, wherein:
    said wind power generator is a Savonius wind power generator.

11. A charging station according to claim 10, wherein:
    an opening is formed at at least one blade of said Savonius wind power generator to reduce reverse torque of said Savonius wind power generator.

12. A charging station according to claim 8, wherein:
    said wind power generator is a Savonius wind power generator.

13. A charging station according to claim 1, wherein:
    said wind power generator is a blade-type wind power generator.

14. A charging station according to claim 8, wherein:
    said wind power generator is a blade-type wind power generator.

* * * * *